June 10, 1958 C. A. ECARY 2,838,724
ELECTRICAL SERVO-MECHANISMS
Filed Feb. 18, 1953
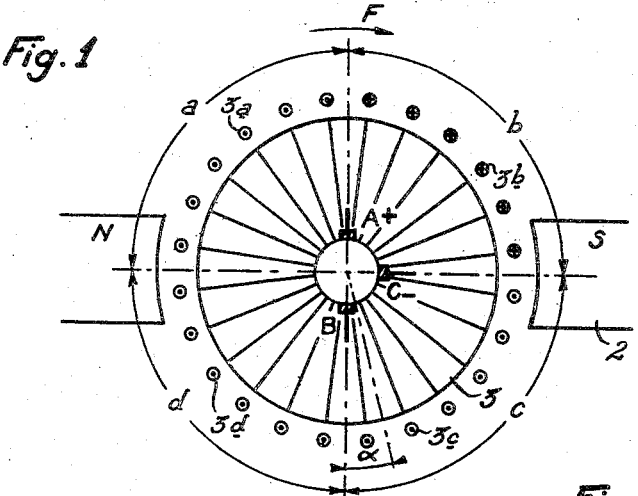
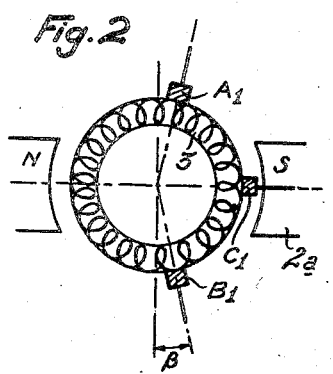
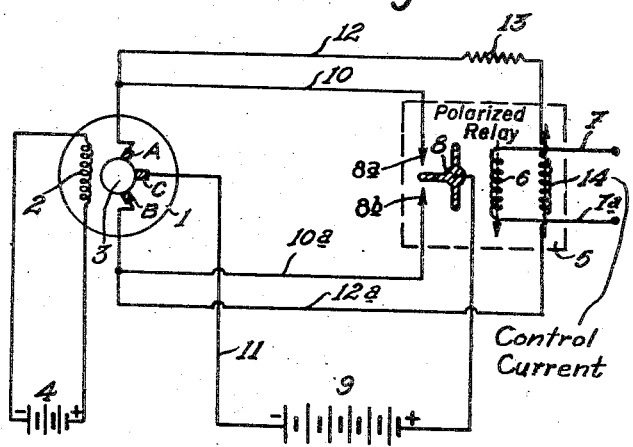

United States Patent Office 2,838,724
Patented June 10, 1958

2,838,724

ELECTRICAL SERVO-MECHANISMS

Charles Auguste Ecary, Courbevoie, France, assignor, by mesne assignments, to Société Commerciale ECA, Asnieres, France Application February 18, 1953, Serial No. 337,636

2 Claims. (Cl. 318—292)

This invention relates to electrical apparatus and more particularly to electrical servo-mechanisms.

Servo-mechanism channels are used in assemblies for regulating normal working conditions of a machine in order to modify said normal working conditions in accordance with the variations of a parameter or parameters capable of varying said normal working conditions. Such servo-mechanism channels comprise an order transmitting device connected with a device for detecting the variations of said parameter or parameters, and a power relay inserted between said order transmitting device and the regulating device for actuating the same in one direction or the other according to the direction of the parameter variations. The power relay consists generally of a motor capable to deliver a power notably greater than that of the regulating orders.

In electrical servo-mechanism channels of the conventional type, the rotation direction of the motor is controlled by means of several relay steps, one relay being generally adapted to receive the regulating order according to which this relay distributes a current in a predetermined direction through either one of a set of two relays, the purpose of which is to respectively transmit the current to the motor in opposed directions. This arrangement leads to complicated diagrams, several interruption causes and a substantial reduction in the efficiency of the servo-mechanism due to the fact that the various response delays keep on accumulating.

With a view to remove such drawbacks and more particularly to improve the response delay of electrical servo-mechanisms while increasing, at the same time, their operating safety by a simplification of the wiring diagram, the present invention has for object an electrical servo-mechanism of the type having a two pole direct current motor with three brushes one of which is permanently connected with a pole of a direct current source while the two others may be connected independently to the other pole of said source by means of an order transmitting relay or control relay connected with the detector for rotating said motor in either one of the directions according to the detected direction of the parameter variation, wherein any idle rotation of the motor as soon as the energized control relay is deenergized is damped in order to maintain a linear relation between the order duration and the response duration of said motor by decreasing the rotation duration thereof, i. e. a linear relation between the control flux in the winding of the control relay and the speed of rotation of the motor.

Said damping device comprises two conducting leads respectively connected to each of the brushes linked to the order receiving relay and interconnected through a resistor and a coil arranged in series, said coil being wound in a reverse direction to that of the coil pertaining to the order receiving relay and arranged in inter-actuation relation with the latter.

The following description, with reference to the appended drawings, only given by way of non limitative example, will enable to fully understand how the invention may be put into practice. In the drawings:

Fig. 1 illustrates diagrammatically a three-brush motor used in an electrical servo-mechanism according to the invention.

Fig. 2 illustrates diagrammatically another three-brush motor.

Fig. 3 is a diagram for an electrical servo-mechanism according to the invention.

In a conventional electrical servo-mechanism, the direct-current motor driving the regulating device has an inductor member fed through an independent power supply while the armature thereof is fed through a three-position control polarized relay having a control winding which receives the control current supplied by the detector and a mechanical flip-flop connected to the positive terminal of a power supply. Said mechanical flip-flop is caused to rotate in one direction or in another according to the direction of the current supplied to the control winding, thus causing the energization either of a relay actuating the motor according to one direction, or of a relay actuating the motor according to the reverse direction. Damping of any idle rotation of the motor as soon as the control winding is deenergized, with a view to decrease the response duration of said motor, is often taken care of by means of a voltage tap taken from the armature of the motor by means of two conducting leads passing through a resistor and constituting a closed circuit with a coil pertaining to the control polarized relay, said coil being wound in a reverse direction to that of the control winding.

Such an arrangement for a servo-mechanism channel does not provide a suitable linear condition between the control flux and the speed of rotation of the motor, owing to the arrangement of the three relays, the switching delays of which accumulate, thus resulting in a simultaneous reduction in the overall response delay for the channel. Moreover, the counter electromotive energization that is created in the damping coil opposes the control flux in the winding of the polarized relay and causes the rotation speed of the motor to become an increasing function of these flux. The damping action thus introduced is not perfect, as it is known that such an action is not exactly linear in relation to the speed of the motor. In particular, when this motor is supplied with current, the voltage across the terminals of the resistor and the damping coil is either maximum or nil and equal to the voltage of the electromotive energization of the power supply. The arrangement consisting in keying onto the shaft of the armature a tachometer dynamo generator cannot be taken into consideration because it is composite and increases greatly the inertia of the motor.

According to the invention, and with a view to remove these drawbacks, a three-brush direct-current motor is used, such as the motor 1 diagrammatically illustrated in Fig. 1.

The inductor member 2 is diagrammatically shown through both its north and south poles. The winding of the armature 3 is a conventional interlaced drum winding 3a, 3b, 3c and 3d which cooperates with three brushes. Two of them, A and B are arranged along the neutral line. The third brush C, arranged along the line of the poles is permanently connected to the negative terminal of the power supply.

By feeding with positive current either brush A or brush B, the motor is caused to rotate according to one or the other direction. Supposing the brush A is fed with positive current, a current flows through windings $3a$ to $3d$. For quadrants $a$, $c$ and $d$, said current flows from the rear part of the armature to its front part with respect to the figure, while for quadrant $b$, it flows from the front part to the rear part of said armature. It results from this fact that the fluxes initiated in quadrants $a$, $b$, $d$ cause the motor to rotate in the same direction, for instance from brush A towards brush C. Only the flux initiated in $c$ opposes such a rotation.

This latter effect, however, can be reduced by short-circuiting several turns of the armature winding by means of the brush B, that is not energized, with a view to render inefficient a sector $\alpha$ of quadrant $c$. The pitch of the winding is so designed as to provide a maximum number of opposed turns short-circuited through the non-energized brush.

The arrangement also permits to suppress amplifying relays, which results in improving the linear condition for the servo-mechanism between the control flux and the rotation speed of the motor as well as its overall response delay.

Moreover, the voltage tapping from the armature allows to introduce a much more efficient linear damping of the idle rotation of the motor than the one resulting from conventional diagrams.

In the embodiment shown in Fig. 2, the brushes $A_1$ and $B_1$ are symmetrically arranged with respect to the line of the poles at an angle $\beta$ from the neutral line towards brush C. Therefore, the flux opposed to the rotation of the motor is decreased.

Fig. 3 is a diagram concerning an electrical servo-mechanism improved according to the invention. The inductor winding 2 of the direct current motor 1 of the servo-mechanism is fed through the direct current power supply 4. The armature 3 is fed through a control polarized relay 5 comprising a control winding 6 receiving the control current through conducting leads 7 and $7a$ and a two-position rockable contact member or mechanical flip-flop 8 connected to the positive terminal of a power supply 9 and having three positions, a rest position shown in Fig. 3 and two operative positions respectively corresponding to the engagement of the operative contacts $8a$ and $8b$ by said flip-flop 8. Said mechanical flip-flop is then caused to pivot in one direction or in another according to the direction of the current supplied to the control winding 6, and causes the closing of a circuit between this power supply 9 and either the brush A through lead 10 or the brush B through lead $10a$. The third brush C is connected through the connecting lead 11 to the negative terminal of the direct current power supply 9.

When the mechanical flip-flop 8 tilts over, one of the circuits: source 9—mechanical flip-flop 8—operative contact $8a$—lead 10—brush A—armature 3—brush C—lead 11 and source 9, or source 9—mechanical flip-flop 8—operative contact $8b$—lead $10a$—brush B—armature 3—brush C—lead 11 and source 9, is fed with a positive current. This positive current actuates the motor which starts rotating according to one or the other direction. Damping of any idle rotation of the motor when the control winding becomes deenergized is obtained by means of a voltage tap taken from the armature by means of two voltage tap conducting leads 12 and $12a$ interconnected through a resistor 13 and a flux generating coil 14 connected in series with said resistor 13. Said coil 14 pertaining to the control polarized relay 5 is wound in a reverse direction to that of the coil 6.

Said device operates as follows:

Assuming brushes A and C are supplied with direct current, brush C being directly connected to the negative pole of the D. C. source 9 while brush A is connected to the positive pole of said source through mechanical flip-flop 8 which engages operative contact $8a$ under the energization of control winding 6. The voltage existing between brushes A and B is a linear function of the speed of the motor. As soon as control winding 6 is deenergized, the motor which rotates for example in the direction corresponding to A towards C, keeps on rotating idle and causes an electromotive energization to be initiated. This electromotive energization passes through the damping coil 14 from A towards B, that is to say according to a suitable direction for causing the mechanical flip-flop 8 of relay 5 to engage the operative contact $8b$, thus causing the brush B to be energized, whereby the armature 3 is reconnected to the source 9 in a reverse manner which rapidly slows the motor.

The same phenomenon would occur, but in the reverse direction, if the brush B had been connected to the positive pole of the source of current.

If an order transmitted to the control winding 6 induces the energization of brush A, the total voltage from the current source 9 is initially applied across the brushes A and C. The motor starts, its speed increases and a voltage in linear relation to the speed of the motor occurs across the terminals of the coil 14, i. e. across A and B.

As soon as this voltage rises enough to create a current through damping winding 14, which current cancels the order transmitted to the coil 6, the flip-flop 8 returns to its rest position. It is thus possible, in this way, to make the speed of the motor a linear function of the control flux transmitted by the control winding 6. Such a progressive damping does therefore provide the linear condition for the system.

It is obvious, of course, that without departing from the scope of the present invention as defined in the appended claims, modifications could be introduced with respect to the device herein described and illustrated. In particular, the motor, instead of being a motor provided with separate excitation, could be of another type.

What I claim is:

1. An electrical servo-mechanism comprising, in combination, a direct current motor having an exciting winding separately excited by a direct current having a constant direction, an armature winding and three brushes cooperating with said armature winding; a source of direct current one pole of which is connected with one of said brushes; an order receiving relay having a winding receiving a current function of the working orders, a two-position rockable contact member connected to the other pole of the source of current and two operative contacts respectively connected to the two other brushes of the direct-current motor and adapted to be closed by said two-position rockable contact member; and a damping device adapted to damp the idle rotation of the motor as soon as the energized order receiving relay is deenergized, said device comprising a resistor and a coil arranged in series, said coil being wound in reverse direction to that of the winding of the order receiving relay and arranged in inter-actuation relation with the latter, one conducting lead interconnecting said resistor and one of the brushes connected to a rest contact of the order receiving relay, and a second conducting lead interconnecting said coil and the other brush connected to the other rest contact of said relay.

2. In an electrical servo-mechanism of the type having a two pole direct current motor having an armature provided with three brushes one of which is permanently connected with a pole of a direct current source while the two others may be connected independently to the other pole of said source by means of a control relay having an operating winding including current input terminals for receiving control variations of a parameter capable of varying the normal working conditions of a machine, for rotating said motor in either one of the directions according to the detected direction of the parameter variation; the improvement which comprises voltage tap means from the two other brushes of the armature and means generating a flux in reverse direction to that of the flux generated by the operating winding of the control relay and connected to said voltage tap means, whereby with said control relay deenergized the armature is immediately reconnected to the direct current source in a reverse manner rapidly to decelerate the motor.

References Cited in the file of this patent

UNITED STATES PATENTS

| | | |
|---|---|---|
| 294,165 | Van Depoele | Feb. 26, 1884 |
| 1,518,013 | Starr | Dec. 2, 1924 |
| 2,198,736 | Norris et al. | Apr. 30, 1940 |
| 2,724,081 | La Source | Nov. 15, 1955 |

FOREIGN PATENTS

| | | |
|---|---|---|
| 908,537 | France | Sept. 24, 1945 |